United States Patent [19]

Yin

[11] 4,373,011

[45] Feb. 8, 1983

[54] BLENDS OF ALGIN, TAMARIND, AND A POLYCATIONIC ELECTROCONDUCTIVE POLYMER

[75] Inventor: Robert I. Yin, LaJolla, Calif.

[73] Assignee: Merck & Co., Inc., Rahway, N.J.

[21] Appl. No.: 268,525

[22] Filed: May 29, 1981

Related U.S. Application Data

[63] Continuation-in-part of Ser. No. 169,578, Jul. 17, 1980, abandoned.

[51] Int. Cl.[3] .............................................. B32B 21/04

[52] U.S. Cl. ...................................... 428/537; 524/28; 524/55; 524/815

[58] Field of Search ........................ 252/500; 428/537; 524/28, 55, 815

[56] References Cited

U.S. PATENT DOCUMENTS 3,288,770 11/1966 Butter ................................. 524/815

4,257,768 3/1981 Racciato et al. .................... 106/208

FOREIGN PATENT DOCUMENTS 55-5073773 6/1980 Japan .................................. 252/500

OTHER PUBLICATIONS

"Application and Evaluation of a New Electroconductive Polymer", Tappi, vol. 50, No. 1 (1967), pp. 26-38.

*Primary Examiner*—James J. Bell

*Attorney, Agent, or Firm*—Gabriel Lopez; Hesna J. Pfeiffer

[57] ABSTRACT

A novel blend of two components: one a blend of algin and tamarind; and the other, a polycationic electroconductive polymer is disclosed, which is used as a paper coating composition. The paper coated above improvement in film-forming, reduction in air porosity, and an increase in oil and solvent holdout.

3 Claims, No Drawings

BLENDS OF ALGIN, TAMARIND, AND A POLYCATIONIC ELECTROCONDUCTIVE POLYMER

CROSS-REFERENCE

This is a continuation-in-part of U.S. Ser. No. 169,578, filed July 17, 1980 now abandoned.

DESCRIPTION OF THE PRIOR ART

Blends of algin and tamarind have recently been described in U.S. Pat. No. 4,257,768 and in EPO Ser. No. 79 302 481.1, filed Nov. 6, 1979. The blend was taught to be useful in paper coatings.

The polycationic electroconductive polymer used is Conductive Polymer 261, sold by Calgon Corporation, described in U.S. Pat. No. 3,288,770, and TAPPI, Vol. 50, No. 1, 1967, pp. 26–38. This is a linear chain, repeating ring polymer having quaternary ammonium salt groups on the backbone.

SUMMARY OF THE INVENTION

It has now been found that blends of the algin-tamarind with Conductive Polymer 261 improve the water retention, film-forming, release (less tackiness), and solvent holdout properties of the polymer. Amounts of algin-tamarind relative to the amount of total solids of polymer plus blend range from 1.5–10% by weight, preferably about 1.6–4% by weight. The best algin-tamarind blend is a 1:4 blend made as disclosed in EPO Ser. No. 79 302 481.1, supra. An example from that publication is as follows:

20:80 Dry Blend

Sodium alginate and tamarind kernel powder are dry mixed in the weight ratio 20:80. The mix is dissolved in deionized water by heating to 74° C. for 20 min. with stirring. The solution is cooled to room temperature and concentrations of 0.5%, 1% and 2% are prepared.

PREFERRED EMBODIMENTS

The blend of algin-tamarind in Conductive Polymer 261 is made by first dissolving the algin-tamarind blend in water (about 2% by weight concentration). Procedures for dissolving it involve slowly adding the blend with vigorous stirring at elevated temperatures to distilled water. Generally, a syrupy, translucent liquid results in about 15 min. This solution is then mixed with the commercial solution of Conductive Polymer 261 (generally available as a 40% aqueous solution), in amounts so that about 96–97% of the final dry coating is Polymer 261 and about 4–3% is the blend. The actual working amount of solids in the paper coating composition is about 12% solids.

This invention is illustrated by the following experimental description.

A 2% by weight solution of a dry blend (4:1) of tamarind gum:sodium alginate was prepared by slowly adding it with vigorous stirring at elevated temperatures to distilled water, and maintaining these conditions until it dissolves (about 15 min). Subsequent solution was a syrupy, translucent, tan liquid.

The other component used in the formulations was Conductive Polymer 261 (Calgon CP 261LV) (1500 cPs at 22° C.). The order of addition of components in each color is given in Table I. All formulations made down fairly easily with no major problems.

The blend was mixed with CP-261LV at 3:97 weight ratio (based on active solids) and compared to plain CP-261LV in a typical size press color of 12.4% total solids. The drawdown evaluations were made on a 38-pound conditioned Camas rawstock. In each case, three drawdowns were made using a No. 3 Meyer rod and three were made using a No. 10 Meyer rod. The felt side was coated in all cases. Drawdown designations, basis weights and coat weights are listed in Table II.

The usual coating, drying and conditioning techniques were used. Coatweights were obtained using an analytical balance (before and after application of the color).

A 2% dyed toluene solution was used in the solvent holdout evaluations, using the Weyerhaeuser Chart was used to determine percent penetration.

TABLE 1

Composition of Conductive Coating Formulations

| Formulation Designation | Component | Order of Addition | Wt. % in Dry Coating | % Solids in Formulation | Wt. of Component in Color |
|---|---|---|---|---|---|
| X1660-9-1 | CP-261LV (40%) | 2 | 100.0 | 12.4 | 93.0 |
| | Water | 1 | — | — | 207.0 |
| | | | 100.0% | 12.4% | 300.0 g |

NOTE:
Final pH was 4.4; Brookfield viscosity was 26 cPs at 23° C. (LVF, No. 2 spindle, 60 rpm)

| Formulation Designation | Component | Order of Addition | Wt. % in Dry Coating | % Solids in Formulation | Wt. of Component in Color |
|---|---|---|---|---|---|
| X1660-9-3 | CP-261LV (40%) | 2 | 96.8 | 12.0 | 90.0 |
| | Blend tamarind/ algin 4:1 | 3 | 3.2 | 0.4 | 60.0 |
| | Water | 1 | — | — | 150.0 |
| | | | 100.0% | 12.4% | 300.0 g |

NOTE:
Components mixed easily with no agglomerates; however, some sedimentation did occur on standing. Final pH was 4.4; Brookfield viscosity was 47 cPs at 23° C.

TABLE II

Drawdown Designations, Basis Weights and Coat Weights

| Formulation Designation | Sheet No. | Rod Used | Basis Weight (lbs/3000 $ft^2$) | Coating Weight (lbs/3000 $ft^2$) |
|---|---|---|---|---|
| X1660-9-1 | 1 | 3 | 38.49 | 0.82 |
| (Calgon CP-261LV Control) | 2 | 3 | 38.60 | 1.21 (Heavy leading edge) |

TABLE II-continued

| Drawdown Designations, Basis Weights and Coat Weights | | | | |
|---|---|---|---|---|
| Formulation Designation | Sheet No. | Rod Used | Basis Weight (lbs/3000 ft$^2$) | Coating Weight (lbs/3000 ft$^2$) |
| | 3 | 10 | 38.71 | 0.74 |
| | 4 | 10 | 38.79 | 2.13 |
| | 5 | 10 | 38.87 | 2.12 |
| | 6 | 10 | 38.55 | 2.10 |
| X1660-9-3 (Tamarind-algin test | 13 | 3 | 38.88 | 0.84 |
| | 14 | 3 | 38.73 | 0.80 |
| | 15 | 3 | 38.41 | 0.79 |
| | 16 | 10 | 38.67 | 1.99 |
| | 17 | 10 | 38.35 | 2.07 |
| | 18 | 10 | 38.56 | 2.02 |

TABLE III

| Surface Resistivity and Solvent Holdout Properties of Conductive Coating Drawdowns | | | |
|---|---|---|---|
| Sample Designation | Surface Resistivity | | Solvent Holdout |
| (Sheet Number) | α 18.2% R.H. | α 50% R.H. | (% Penetration) |
| 2 | $9.7 \times 10^8$ | $3.3 \times 10^7$ | 30 |
| 4 | $3.3 \times 10^8$ | $6.9 \times 10^6$ | |
| 13 | $9.9 \times 10^8$ | $3.3 \times 10^7$ | 15 |
| 16 | $2.1 \times 10^8$ | $7.3 \times 10^6$ | |

TABLE IV

| Tack Test Results for Conductive Coating Drawdowns | | |
|---|---|---|
| Sample Designation (Sheet Number) | Hand Tack Test | James River Calender Test |
| 1 | low to medium | sheet stuck to steel roll |
| 3 | low to medium | sheet stuck to steel roll |
| 5 | heavy | |
| 6 | heavy | |
| 14 | low to medium | did not stick to either roll |
| 15 | low to medium | did not stick to either roll |
| 17 | heavy | |
| 18 | heavy | |

The combinations drawn from the above data indicate that the alginate:tamarind blend does not adversely affect conductivity of the Polymer 261.

Surface resistivity measurements at 20% and 50% relative humidity were nearly identical to the respective CP-261LV coated sheets, see Table III for additional details.

Solvent holdout properties of drawdowns coated with the CP-261LV/alginate:tamarind blend formulations were significantly *better* than with CP-261LV alone, see Table III for details.

At the concentration used with CP-261LV, the alginate:tamarind blend appeared to have a significant beneficial effect in reducing sheet tackiness. Table IV gives details of experimental results.

Alginate alone mixed with Polymer 261 is not compatible; a gel forms which cannot be tested.

Lack of sheet stiffness is a common problem in conductivized reprographic papers, especially at high relative humidities. Where this occurs, one solution is to increase the basis weight of the paper, which is of economic disadvantage. A property of the blends of this invention is that they stiffen paper when applied at the levels used for coating paper.

What is claimed is:

1. An aqueous solution comprising 0.4% of a blend of tamarind kernal powder and sodium alginate (4:1 weight ratio) and 12% of a polycationic, electroconductive, linear chain, repeating ring polymer having quaternary ammonium salt groups on the backbone said polymer being a homopolymeric molecular chain of repeating units of a formula selected from the group consisting of:

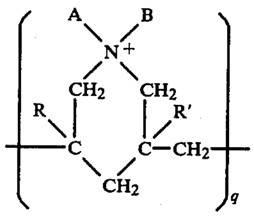

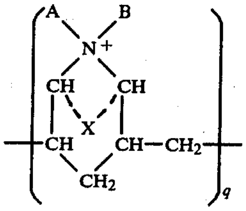

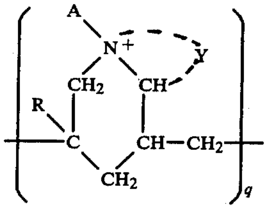

and

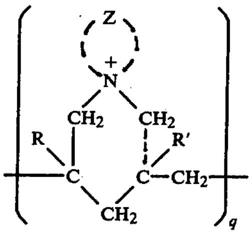

said polymer having an intrinsic viscosity in 0.1 N potassium chloride of at least between about 0.5 and 2.0, and wherein A and B independently represent a member selected from the class consisting of alkyl and phenyl radicals on which any substituents are selected from the group consisting of hydroxy, amido, carboloweralkoxy, loweralkoxy, phenoxy, naphthoxy, cyano, thioloweralkoxy, thiophenoxy, loweralkoyl, 5- and 6-membered cycloalkyl, tri-(loweralkyl-)ammoniumloweralkyl, with, on the alkyl groupings only, a nitro group, and, on the phenyl radicals only, a halogen atom; and, taken together, A and B represents a member selected from the group consisting of $—CH_2—CH_2—$, $—CH(CH_3)—CH(CH_3)—CH{=}CH—CH{=}CH—$, $—CH{=}CH—CH{=}N—$ and $—CH{=}CH—N{=}CH—$ R and R' independently represent a member selected from the class consisting of hydrogen, chloro, bromo, loweralkyl, and phenyl radicals;

X represents a divalent radical of the formula $—CH_2—(O)_n—(CH_2)_m—$

Y represents a divalent radical of the formula $—(CH_2)_p—(O)_n—CH_2—$

Z represents a divalent radical of the formula $—(CH_2)_p—(O)_n—(CH_2)_2—$ and n is one of the numbers 0 and 1;

m is one of the numbers 1 and 2;

p is one of the numbers 2 and 3 and the symbol Q is an integer representing the number of units in the molecular chain.

2. A paper coated with a conductive coating comprising 1.5–10% by weight of a blend of tamarind kernal powder and sodium alginate, 4:1 weight ratio, and 90–98.5% by weight of a polycationic, electroconductive, linear chain, repeating ring polymer having quaternary ammonium salt groups on the backbone said polymer being a homopolymeric molecular chain of repeating units of a formula selected from the group consisting of:

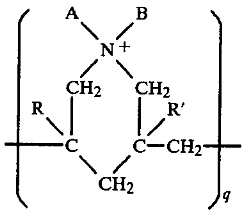

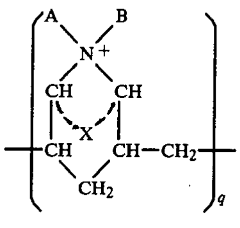

-continued

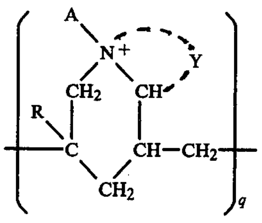

and

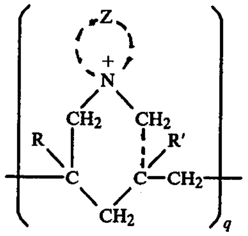

said polymer having an intrinsic viscosity in 0.1 N potassium chloride of at least between about 0.5 and 2.0, and wherein A and B independently represent a member selected from the class consisting of alkyl and phenyl radicals on which any substituents are selected from the group consisting of hydroxy, amido, carboloweralkoxy, loweralkoxy, phenoxy, naphthoxy, cyano, thioloweralkoxy, thiophenoxy, loweralkoyl, 5- and 6-membered cycloalkyl, tri-(loweralkyl-)ammoniumloweralkyl, with, on the alkyl groupings only, a nitro group, and, on the phenyl radicals only, a halogen atom; and, taken together, A and B represents a member selected from the group consisting of $—CH_2—CH_2—$, $—CH(CH_3)—CH(CH_3)—CH{=}CH—CH{=}CH—$, $—CH{=}CH—CH{=}N—$ and $—CH{=}CH—N{=}CH—$ R and R' independently represent a member selected from the class consisting of hydrogen, chloro, bromo, loweralkyl, and phenyl radicals;

X represents a divalent radical of the formula $—CH_2—(O)_n—(CH_2)_m—$

Y represents a divalent radical of the formula $—(CH_3)_p—(O)_n—CH_2—$

Z represents a divalent radical of the formula $—(CH_2)_p—(O)_m—(CH_2)_2—$ and n is one of the numbers 0 and 1;

m is one of the numbers 1 and 2;

p is one of the numbers 2 and 3 and the symbol Q is an integer representing the number of units in the molecular chain.

3. The paper of claim 2 wherein the conductive coating comprises 96–98.4% by weight of a polycationic, electroconductive, linear chain, repeating ring polymer and 1.6–4% by weight of a blend of tamarind kernal powder and sodium alginate, 4:1 weight ratio.

* * * * *